(12) United States Patent
Naes et al.

(10) Patent No.: US 9,778,386 B2
(45) Date of Patent: *Oct. 3, 2017

(54) AUTONOMOUS SEISMIC NODES FOR THE SEABED

(71) Applicant: Seabed Geosolutions B.V., Leidschendam (NL)

(72) Inventors: Johan Fredrik Naes, Trondheim (NO); Richard Edward Henman, Horsham (GB); Arne Henning Rokkan, Olsvik (NO); Leif Johan Larsen, Alversund (NO); Mariann Ervik, Trondheim (NO)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,626

(22) Filed: Sep. 29, 2016

(65) Prior Publication Data

US 2017/0017003 A1   Jan. 19, 2017

Related U.S. Application Data

(63) Continuation of application No. 14/821,471, filed on Aug. 7, 2015, now Pat. No. 9,523,780.
(Continued)

(51) Int. Cl.
*G01V 1/18*  (2006.01)
*G01V 1/38*  (2006.01)

(52) U.S. Cl.
CPC .................. *G01V 1/18* (2013.01); *G01V 1/38* (2013.01); *G01V 1/3852* (2013.01); *G01V 2210/1427* (2013.01)

(58) Field of Classification Search
USPC ........................................................ 367/149
See application file for complete search history.

(56) References Cited

U.S. PATENT DOCUMENTS

| 2,166,916 A | 7/1939 | Lombard |
| 4,692,906 A * | 9/1987 | Neeley ..................... G01V 1/38 114/333 |

(Continued)

FOREIGN PATENT DOCUMENTS

| GB | 2492889 | 1/2013 |
| WO | 2005074426 A2 | 8/2005 |

(Continued)

OTHER PUBLICATIONS

Wilcock, W. S. D. et al. "The Deployment of a Long-Term Seafloor Seismic Network on the Juan de Fuca Ridge", Oceans 2007, IEEE, Piscataway, NJ USA, Sep. 29, 2007 (Sep. 29, 2007), pp. 1-6.

*Primary Examiner* — Luke Ratcliffe
*Assistant Examiner* — Amie M N'Dure
(74) *Attorney, Agent, or Firm* — Park, Vaughan, Fleming & Dowler LLP; Shane A. Nelson (57) ABSTRACT

Embodiments of an autonomous seismic node that can be positioned on the seabed are disclosed. The autonomous seismic node comprises a pressurized node housing substantially surrounded and/or enclosed by a non-pressurized node housing. The seismic node may be substantially rectangular or square shaped for node storage, handling, and deployment. One or more node locks may be coupled to either (or both) of the pressurized node housing or the non-pressurized node housing. The pressurized node housing may be formed as a cast monolithic titanium structure and may be a complex shape with irregularly shaped sides and be asymmetrical. In other embodiments, a non-pressurized housing may substantially enclose other devices or payloads besides a node, such
(Continued)

as weights or transponders, and be coupled to a plurality of protrusions.

24 Claims, 6 Drawing Sheets

Related U.S. Application Data (60) Provisional application No. 62/044,471, filed on Sep. 2, 2014, provisional application No. 62/034,584, filed on Aug. 7, 2014.

(56) References Cited

U.S. PATENT DOCUMENTS

| | | | |
|---|---|---|---|
| 4,912,817 A | 4/1990 | Sandreid | |
| 5,070,805 A | 12/1991 | Plante | |
| 5,189,642 A * | 2/1993 | Donoho | G01V 1/38 181/122 |
| 6,024,344 A | 2/2000 | Buckley | |
| 6,044,786 A | 4/2000 | Dudley | |
| 6,288,972 B1 | 9/2001 | Norris | |
| 6,657,921 B1 | 12/2003 | Ambs | |
| 7,092,315 B2 | 8/2006 | Olivier | |
| 7,254,093 B2 | 8/2007 | Ray | |
| 7,260,024 B2 | 8/2007 | Goujon | |
| 7,286,442 B2 | 10/2007 | Ray et al. | |
| 7,310,287 B2 | 12/2007 | Ray | |
| 7,561,493 B2 | 7/2009 | Ray | |
| 7,602,667 B2 | 10/2009 | Thompson | |
| 7,646,670 B2 * | 1/2010 | Maxwell | G01V 1/16 181/122 |
| 7,649,803 B2 | 1/2010 | Ray | |
| 7,668,047 B2 | 2/2010 | Ray | |
| 7,724,607 B2 | 5/2010 | Ray | |
| 7,778,114 B2 | 8/2010 | Goujon | |
| 7,804,737 B2 | 9/2010 | Thompson | |
| 7,883,292 B2 | 2/2011 | Thompson | |
| 7,929,378 B2 | 4/2011 | Gros | |
| 7,933,165 B2 | 4/2011 | Thompson | |
| 7,986,589 B2 | 7/2011 | Ray | |
| 7,990,803 B2 | 8/2011 | Ray | |
| 8,021,080 B2 | 9/2011 | Frivik | |
| 8,050,140 B2 | 11/2011 | Ray | |
| 8,087,848 B2 | 1/2012 | Thompson | |
| 8,096,253 B1 | 1/2012 | Ruffa | |
| 8,149,647 B2 | 4/2012 | Borgen | |
| 8,172,480 B2 | 5/2012 | Thompson | |
| 8,226,328 B2 | 7/2012 | Thompson | |
| 8,228,761 B2 | 7/2012 | Ray | |
| 8,328,467 B2 | 12/2012 | Thompson | |
| 8,427,900 B2 | 4/2013 | Fieure | |
| 8,619,495 B2 | 12/2013 | Thompson | |
| 8,675,446 B2 * | 3/2014 | Gateman | G01V 1/201 367/15 |
| 8,801,328 B2 | 8/2014 | Thompson | |
| 8,864,416 B2 | 10/2014 | Thompson | |
| 8,879,362 B2 | 11/2014 | Ray | |
| 8,942,059 B2 | 1/2015 | Furuhaug | |
| 9,170,344 B2 | 10/2015 | Lindberg | |
| 2005/0052951 A1 * | 3/2005 | Ray | G01V 1/247 367/188 |
| 2008/0080318 A1 * | 4/2008 | Maxwell | G01V 1/16 367/131 |
| 2008/0144442 A1 * | 6/2008 | Combee | G01V 1/22 367/131 |
| 2009/0027999 A1 * | 1/2009 | Ray | G01V 1/16 367/37 |
| 2011/0051550 A1 | 3/2011 | Lindberg | |
| 2012/0081994 A1 * | 4/2012 | Husom | G01V 1/201 367/16 |
| 2013/0058192 A1 * | 3/2013 | Gateman | G01V 1/201 367/20 |
| 2013/0163374 A1 | 6/2013 | Herrmann | |
| 2014/0198607 A1 | 7/2014 | Etienne | |
| 2014/0211589 A1 | 7/2014 | Maxwell | |
| 2015/0136012 A1 * | 5/2015 | Williams | B63G 8/001 114/312 |
| 2016/0041280 A1 * | 2/2016 | Naes | G01V 1/18 367/149 |

FOREIGN PATENT DOCUMENTS

| | | |
|---|---|---|
| WO | 2006041438 A1 | 4/2006 |
| WO | 2011139159 A1 | 11/2011 |
| WO | 2014027892 A1 | 2/2014 |
| WO | 2014084741 A1 | 6/2014 |

* cited by examiner

AUTONOMOUS SEISMIC NODES FOR THE SEABED

PRIORITY

The present application is a continuation application of U.S. patent application Ser. No. 14/821,471, filed on Aug. 7, 2015, which claims priority to U.S. provisional patent application No. 62/034,584, filed on Aug. 7, 2014, and U.S. provisional patent application No. 62/044,471, filed on Sep. 2, 2014. The entire contents of each of the above documents is incorporated herein by reference.

BACKGROUND OF THE INVENTION

Field of the Invention

This invention relates to marine seismic systems and more particularly relates to autonomous seismic nodes that may be deployed on the seabed.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. Prior autonomous nodes include spherical shaped nodes, cylindrical shaped nodes, and disk shaped nodes. Other prior art systems include a deployment rope/cable with integral node casings or housings for receiving autonomous seismic nodes or data recorders. Some of these devices and related methods are described in more detail in the following patents, incorporated herein by reference: U.S. Pat. Nos. 6,024,344; 7,310,287; 7,675,821; 7,646,670; 7,883,292; 8,427,900; and 8,675,446. Traditional prior art nodes are often made of tubes of various shapes that are joined and/or coupled together with cables, which can be vulnerable to handling and assembly errors. Other prior nodes can be made of spherical glass pressure housings that need additional protection and are less than ideal for storage, handling, and stability when on the seabed.

One known node storage, deployment, and retrieval system is disclosed in U.S. Pat. No. 7,883,292 to Thompson, et al. ("Thompson '292"), and is incorporated herein by reference. Thompson et al. discloses a method and apparatus for storing, deploying and retrieving a plurality of seismic devices, and discloses attaching the node to the deployment line by using a rope, tether, chain, or other cable such as a lanyard that is tied or otherwise fastened to each node and to a node attachment point on the deployment line. U.S. Pat. No. 6,024,344 to Buckley, et al. ("Buckley") also involves attaching seismic nodes to the deployment line. Buckley teaches that each node may be connected to a wire that is then connected to the deployment line though a separate connector. This connecting wire approach is cumbersome because the wires can get tangled or knotted, and the seismic nodes and related wiring can become snagged or tangled with structures or debris in the water or on the sea floor or on the marine vessel. U.S. Pat. No. 8,427,900 to Fleure, et al. ("Fleure") and U.S. Pat. No. 8,675,446 to Gateman, et al. ("Gateman") each disclose a deployment line with integral node casings or housings for receiving seismic nodes or data recorders. One problem with integration of the casings with the deployment line is that the deployment line becomes difficult to manage and store. The integrated casings make the line difficult to wind onto spools or otherwise store manageably. In these embodiments, the node casings remain attached directly in-line with the cable, and therefore, this is a difficult and complex operation to separate the electronics sensor package from the node casings.

The referenced shortcomings are not intended to be exhaustive, but rather are among many that tend to impair the effectiveness of previously known techniques in seafloor deployment systems; however, those mentioned here are sufficient to demonstrate that the methodologies appearing in the art have not been satisfactory and that a significant need exists for the systems, apparatuses, and techniques described and claimed in this disclosure.

The existing techniques for attaching an autonomous node to a cable suffer from many disadvantages. As an example, attaching a node to a rope that is coupled to the deployment line often gets tangled during deployment and/or retrieval to the seabed, and does not consistently land flat on the seabed, which can cause poor seabed/node coupling and noise. The spiraling of the tether cable can also cause problems during the retrieval when separating the node from the cable. Further, prior techniques of pre-mounted node casings on the deployment line or pre-cut connecting ropes/wires between the node and the deployment line do not allow for a flexible change in adjacent node spacing/distance; any change of node spacing requires significant amount of cost and time. Further, the techniques in which such nodes are deployed and retrieved from a marine vessel, as well as the manner in which such nodes are stored and handled on the vessel, suffer from many disadvantages.

A need exists for an improved autonomous seismic node design for automated node storage, handling, deployment, and recovery. A need exists for a node that provides increased operational parameters, increased seabed coupling, and more versatile deployment options. A need exists for a seismic node design that can be mass-produced in a cost effective manner. A need exists for a node that can be used in multiple deployment configurations. A need exists for a seismic node design that enables large numbers of nodes to be operated in the field.

SUMMARY OF THE INVENTION

Embodiments of an autonomous seismic node that can be positioned on the seabed are disclosed. In one embodiment, the autonomous seismic node may comprise a pressurized node housing and a modular non-pressurized node housing substantially surrounding the pressurized housing. The seismic node may be substantially square shaped for node storage, handling, and deployment. One or more node locks may be coupled to either (or both) of the pressurized node housing or the non-pressurized node housing. In another embodiment, the autonomous seismic node may comprise a pressurized node housing that comprises a monolithic pressuring housing. The pressurized node housing may be formed as a cast monolithic titanium structure and may be an asymmetric or complex shape with irregularly shaped sides. In still another embodiment, a modular non-pressurized housing is disclosed that is configured to substantially surround a seismic device and be substantially square or rectangle shaped. In other embodiments, a non-pressurized housing may substantially enclose other devices or payloads besides a node, such as weights or transponders, and be coupled to a plurality of protrusions.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Node Deployment

Figure 1A:
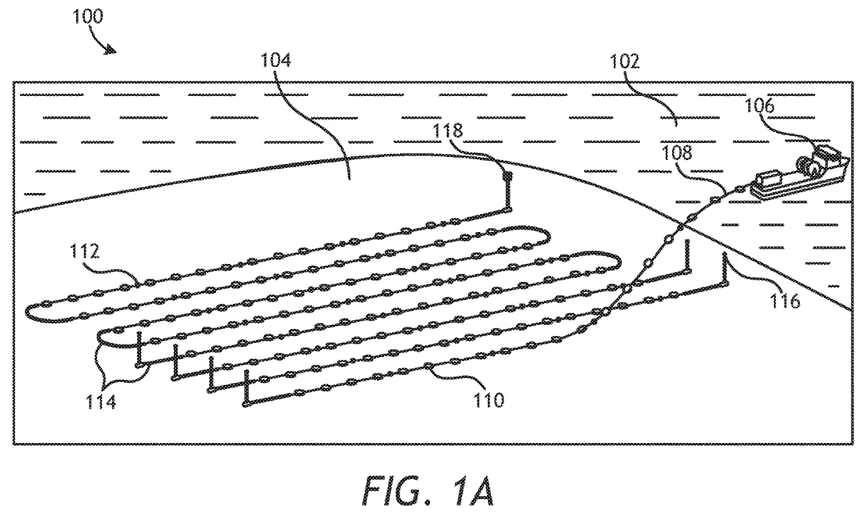
FIG. 1A is a schematic diagram illustrating one embodiment of a system for marine deployment of an autonomous seismic node.
Figure 1B:
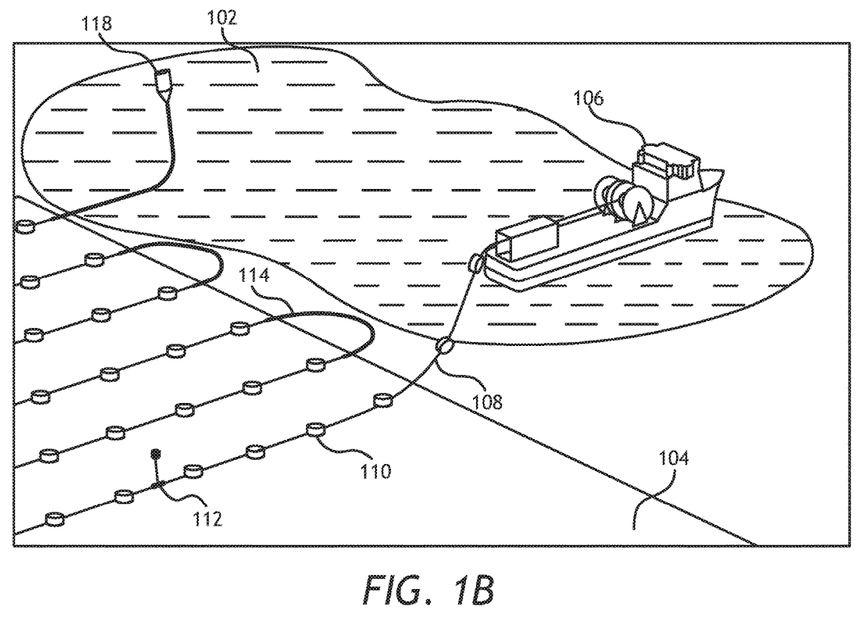
FIG. 1B is a schematic diagram illustrating one embodiment of a system for marine deployment of an autonomous seismic node.

FIGS. 1A and 1B illustrate a layout of a seabed seismic recorder system that may be used with autonomous seismic nodes for marine deployment. FIG. 1A is a diagram illustrating one embodiment of a marine deployment system 100 for marine deployment of seismic nodes 110. One or more marine vessels deploy and recover a cable (or rope) with attached sensor nodes according to a particular survey pattern. In an embodiment, the system includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108. One or more seismic nodes 110 may be attached directly to the deployment line 108. Additionally, the marine deployment system 100 may include one or more acoustic positioning transponders 112, one or more weights 114, one or more pop up buoys 116, and one or more surface buoys 118. As is standard in the art, weights 114 can be used at various positions of the cable to facilitate the lowering and positioning of the cable, and surface buoys 118 or pop up buoys 116 may be used on the cable to locate, retrieve, and/or raise various portions of the cable. Acoustic positioning transponders 112 may also be used selectively on various portions of the cable to determine the positions of the cable/sensors during deployment and post deployment. The acoustic positioning transponders 112 may transmit on request an acoustic signal to the marine vessel for indicating the positioning of seismic nodes 110 on sea floor 104. In an embodiment, weights 114 may be coupled to deployment line 108 and be arranged to keep the seismic nodes 110 in a specific position relative to sea floor 104 at various points, such as during start, stop, and snaking of deployment line 108.

FIG. 1B is a close-up view illustrating one embodiment of a system 100 for marine deployment of seismic nodes 110. In an embodiment, the deployment line 108 may be a metal cable (steel, galvanized steel, or stainless steel). Alternatively, the deployment line 108 may include chain linkage, rope (polymer), wire, or any other suitable material for tethering to the marine vessel 106 and deploying one or more seismic nodes 110. In an embodiment, the deployment line 108 and the seismic nodes 110 may be stored on the marine vessel 106. For example, the deployment line may be stored on a spool or reel or winch. The seismic nodes 110 may be stored in one or more storage containers. One of ordinary skill may recognize alternative methods for storing and deploying the deployment line 108 and the seismic nodes 110.

In one embodiment, the deployment line 108 and seismic nodes 110 are stored on marine vessel 106 and deployed from a back deck of the vessel 106, although other deployment locations from the vessel can be used. As is well known in the art, a deployment line 108, such as a rope or cable, with a weight attached to its free end is dropped from the back deck of the vessel. The seismic nodes 110 are preferably directly attached in-line to the deployment line 108 at a regular, variable, or selectable interval (such as 25 meters) while the deployment line 108 is lowered through the water column and draped linearly or at varied spacing onto the seabed. During recovery each seismic node 110 may be clipped off the deployment line 108 as it reaches deck level of the vessel 106. Preferably, nodes 110 are attached directly onto the deployment line 108 in an automated process using node attachment or coupling machines on board the deck of the marine vessel 106 at one or more workstations or containers. Likewise, a node detaching or decoupling machine is configured to detach or otherwise disengage the seismic nodes 110 from the deployment line 108, and in some instances may use a detachment tool for such detaching. Alternatively, seismic nodes 110 can be attached via manual or semi-automatic methods. The seismic nodes 110 can be attached to the deployment line 108 in a variety of configurations, which allows for free rotation with self-righting capability of the seismic node 110 about the deployment line 108 and allows for minimal axial movement on deployment line 108 (relative to the acoustic wave length). For example, the deployment line 108 can be attached to the top, side, or center of seismic node 110 via a variety of configurations.

Once the deployment line 108 and the seismic nodes 110 are deployed on the sea floor 104, a seismic survey can be performed. One or more marine vessels 106 may contain a seismic energy source (not shown) and transmit acoustic signals to the sea floor 104 for data acquisition by the seismic nodes 110. Embodiments of the system 100 may be deployed in both coastal and offshore waters in various depths of water. For example, the system may be deployed in a few meters of water or in up to several thousand meters of water. In some configurations surface buoy 118 or pop up buoy 116 may be retrieved by marine vessel 106 when the seismic nodes 110 are to be retrieved from the sea floor 104. Thus, the system 110 may not require retrieval by means of a submersible or diver. Rather, pop up buoy 116 or surface buoy 118 may be picked up on the surface 102 and deployment line 108 may be retrieved along with seismic nodes 110.

As mentioned above, to perform a seismic survey that utilizes autonomous seismic nodes, those nodes must be deployed and retrieved from a vessel, typically a surface vessel. In one embodiment a node storage and service system is coupled to one or more deployment systems. The node storage and service system is configured to handle, store, and service the nodes before and after the deployment and retrieval operations performed by a node deployment system. Such a node storage and service system is described in more detail in U.S. patent application Ser. No. 14/711,262, filed on May 13, 2015, incorporated herein by reference. Such a node deployment system is described in more detail in U.S. patent application Ser. No. 14/820,285, filed on Aug. 6, 2015, entitled Overboard System for Deployment and Retrieval of Autonomous Seismic Nodes, incorporated herein by reference.

Autonomous Seismic Node Design

Figure 2A:
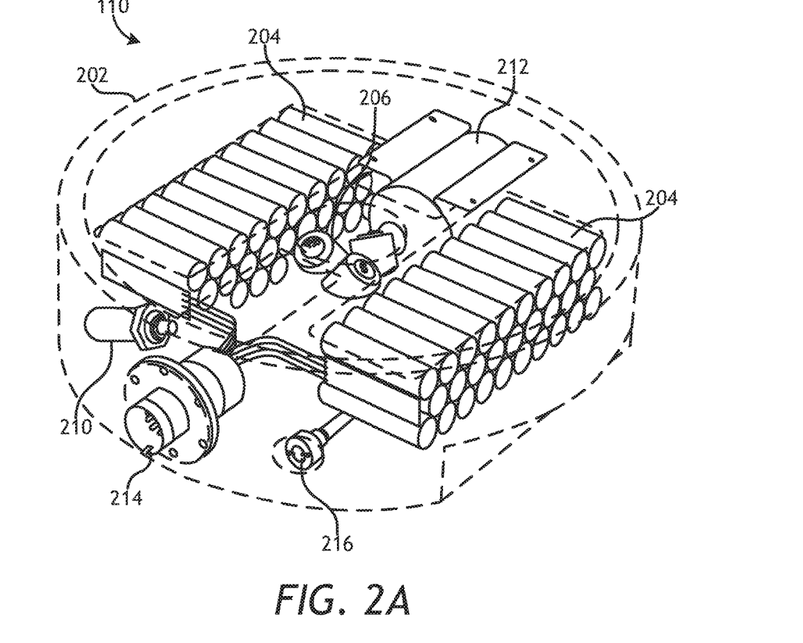
FIG. 2A illustrates a perspective view diagram of one embodiment of an autonomous seismic node.

FIG. 2A illustrates a perspective view diagram of an autonomous ocean bottom seismic node 110. The seismic node 110 may include a body 202, such as a housing, frame, skeleton, or shell, which may be easily dissembled into various components. Additionally, the seismic node 110 may include one or more battery cells 204. In an embodiment, the battery cells 204 may be lithium-ion battery cells or rechargeable battery packs for an extended endurance (such as 90 days) on the seabed, but one of ordinary skill will recognize that a variety of alternative battery cell types or configurations may also be used. Additionally, the seismic node may include a pressure release valve 216 configured to release unwanted pressure from the seismic node 110 at a pre-set level. The valve protects against fault conditions like water intrusion and outgassing from a battery package. Additionally, the seismic node may include an electrical connector 214 configured to allow external access to information stored by internal electrical components, data communication, and power transfer. During the deployment the connector is covered by a pressure proof watertight cap 218 (shown in FIG. 2B). In other embodiments, the node does not have an external connector and data is transferred to and from the node wirelessly, such as via electromagnetic or optical links.

In an embodiment, the internal electrical components may include one or more hydrophones 210, one or more (preferably three) geophones 206 or accelerometers, and a data recorder 212. In an embodiment, the data recorder 212 may be a digital autonomous recorder configured to store digital data generated by the sensors or data receivers, such as hydrophone 210 and the one or more geophones or accelerometers 206. One of ordinary skill will recognize that more or fewer components may be included in the seismic node 110. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures at the bottom of the ocean, as is well known in the art.

Figure 2B:
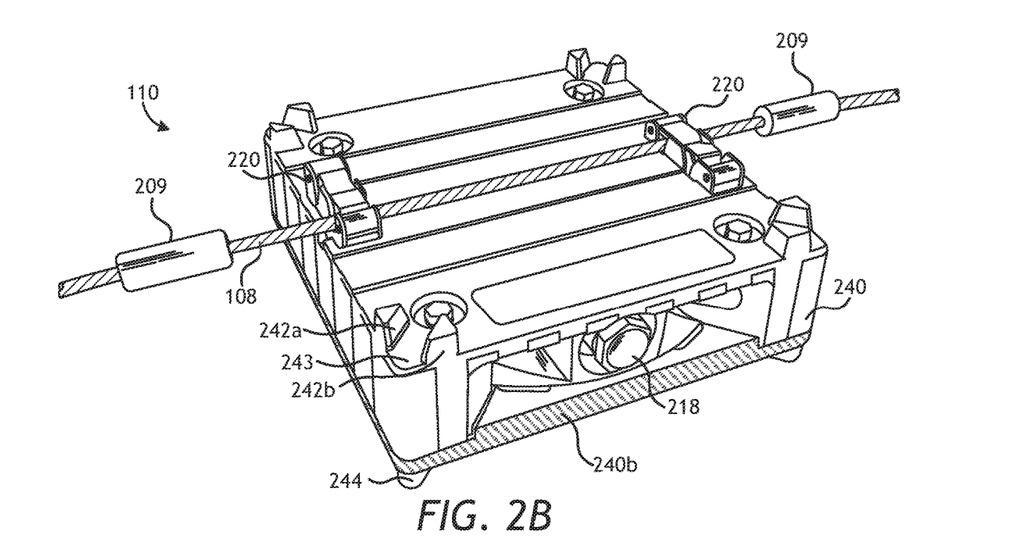
FIG. 2B illustrates a perspective view diagram of another embodiment of an autonomous seismic node.
Figure 5:
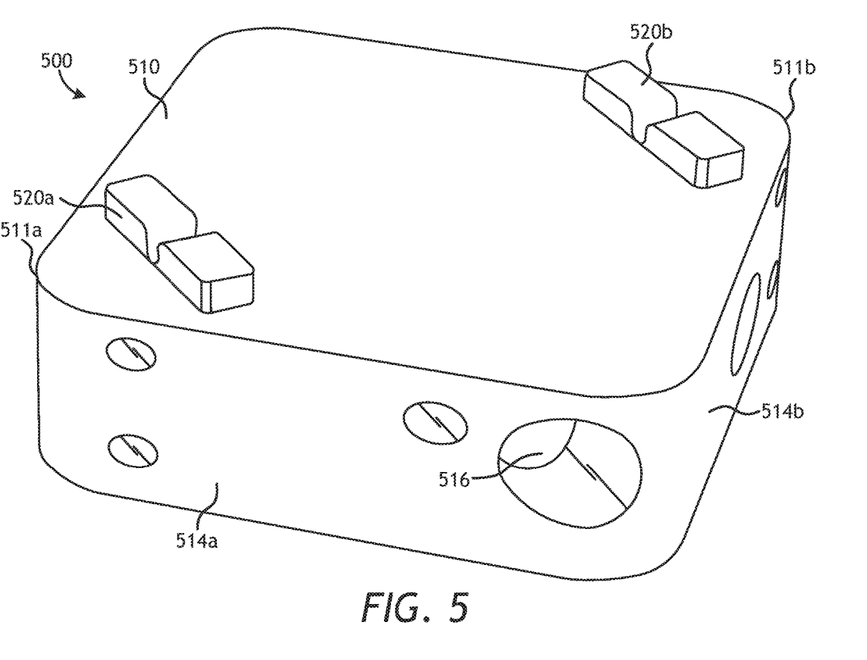
FIG. 5 is a perspective view diagram illustrating one embodiment of a square shaped autonomous seismic node.

While the node in FIG. 2A is circular in shape, the node can be any variety of geometric configurations, including square, rectangular, hexagonal, octagonal, cylindrical, and spherical, among other designs. In one embodiment, the node consists of a watertight, sealed case or pressure housing that contains all of the node's internal components. In another embodiment, the pressurizing node housing is partially and/or substantially surrounded by a non-pressurized node housing that provides the exterior shape, dimensions, and boundaries of the node. The node and/or non-pressurized housing may be square or substantially square shaped so as to be substantially a quadrilateral, as shown in FIG. 2B. In one embodiment the non-pressurized housing has a cross-sectional area that is non-circular and may be in the shape of a square or rectangle. For example, the node may have a first plurality of sides that are substantially parallel to each other and a second plurality of sides that are substantially parallel to each other. One of skill in the art will recognize that such a node is not a two-dimensional object, but includes a height, and in one embodiment may be considered a box, cube, elongated cube, or cuboid. In one embodiment, the node has six exterior faces or surfaces—four side faces, one bottom face, and one top face—and a plurality of corners that meet each of the faces. The corners and edges of the node may or may not be rounded, beveled, angled, or otherwise softened, as shown in FIG. 5. While the node may be geometrically symmetrical about its central axis, symmetry is not a requirement. Further, the individual components of the node may not be symmetrical, but the combination of the various components (such as the pressurized housing and the non-pressurized housing) provide an overall mass and buoyancy symmetry to the node. In one embodiment, the node is approximately 350 mm×350 mm wide/deep with a height of approximately 150 mm. In one embodiment, body 202 of the node has a height of approximately 100 mm and other coupling features, such as node locks 220 or protrusions 242, may provide an additional 20-50 mm or more height to the node. In one embodiment, the height of the node is less than or substantially less that (such as less than half) the width of the node. In other embodiments, the height of the node is approximately the same as the width of the node. The weight of the node may range from approximately 10-30 kilograms, and in one embodiment may weight approximately 20 kilograms, which is approximately the maximum weight that a single operator may routinely handle, move, and/or carry without significant strain.

As shown in FIG. 2B, the node's pressure housing may be coupled to and/or substantially surrounded by external non-pressurized node housing 240. Various portions of non-pressurized node housing 240 may be open and expose the pressurized node housing as needed, such as for hydrophone 210, node locks 220, and data/power transfer connection 214 (shown with a fitted pressure cap 218 in FIG. 2B). Non-pressurized node housing 240 provides many functions, such as protecting the node from shocks and rough treatment, coupling the node to the seabed for better readings (such as low distortion and/or high fidelity readings) and stability on the seabed, and assisting in the stackability, storing, alignment, and handling of the nodes. Non-pressurized node housing 240 may be made of a durable material such as rubber, plastic, carbon fiber, or metal, and in one embodiment may be made of polyurethane or polyethylene. Further, the semi-rigid shape and properties of the non-pressurized housing provides mechanical shock damping to the pressurized node housing during retrieval and deployment operations. In other embodiments, non-pressurized node housing 240 is configured to provide acoustical transparency to the pressurized node housing and/or other enclosed acoustic devices (e.g., the non-pressurized housing has approximately the same acoustic impedance as water). This ensures that acoustic signals are not significantly attenuated, reflected, phase delayed, or otherwise distorted by the non-pressurized housing. Still further, non-pressurized node housing 240 provides extra protection to delicate sensors within the pressurized node housing and/or external to the pressurized node housing, reduces the risk of snagging the node with ropes, and limits debris from entering the node.

In one embodiment, non-pressurized housing 240 comprises handling means to allow handling of the device in water and in air (such as on the back deck of a marine vessel). Handling means includes, but is not limited to, a protruding handle, ring or hook, a rope or wire sling, a flat surface suitable for a suction device, pockets, recesses, cavities, and other devices known to those of ordinary skill in the art. The handling means may cooperate with a handling device, such as, but not limited to, a winch system, a remotely operating vehicle (ROV) manipulator, a suction device attached to an ROV, a remotely triggered pop-up buoy system, or even manual means by the use of a human operator. One of ordinary skill in the art would immediately recognize other means equally suited for this purpose. In this way, the device may be easily grasped, held, oriented/rotated, transported, and released in water and in air. In contrast, prior art nodes typically have limited to no dedicated mechanisms or configurations to hold and/or handle the nodes safely and effectively, not to mention that the heavy weights of such nodes prohibit large scale manual handling by a single operative.

In one embodiment, the upper and lower portions of non-pressurized housing 240 include a plurality of gripping upper and lower teeth or protrusions 242, 244, respectively. The protrusions may be made of the same or different material as non-pressurized housing 240. They can be plastic or metal. The disclosed protrusions provide numerous advantages and offers significant changes to any protrusions used in conventional seismic nodes. First, the disclosed protrusions provide increased general storage and handling capabilities. An upper surface of housing 240 may comprise a first plurality of protrusions 242 and the lower surface of housing 240 may comprise a second plurality of protrusions 244. Each of first plurality of protrusions 242 may comprise a first portion 242a and a second portion 242b that forms an opening 243 that is configured to receive one of the second plurality of protrusions 244 from a separate node. In other words, the protrusions of a first node are configured to couple, mate, and/or engage with the protrusions of a second node for efficient stacking and storing. Likewise, the protrusions are configured to act as guides during conveyor translation in a node handling, storage, and/or servicing system, such that the protrusions are aligned or placed on either side of a conveyor belt and prevent the node from falling off. Second, the protrusions are configured to provide increased seabed coupling. For seismic nodes that are placed on the seabed, coupling with the seabed is essential for many types of seismic devices and for increased seismic data quality. The plurality of protrusions is configured to couple with a wide variety of seabed surfaces. Third, the disclosed protrusions are highly versatile and configurable. The protrusions may be removable and/or replaceable in case of damage or if different protrusion quantities, lengths, or materials are needed for more effective seabed coupling. For example, vertical bars, cylinders, or protrusions can be screwed into the bottom, top, or sides of the node to provide the needed seabed coupling. In one embodiment, a set of four pyramid shaped teeth are provided on the upper and lower corners of non-pressurized housing 240. Other arrangements of the teeth are possible, including conical and cuboid shaped protrusions. In other embodiments, the protrusions may be coupled to one or more detachable/removable plates 240*b* of the non-pressurized housing. Various plates (with different protrusions and/or different material properties) can be utilized for different seabed coupling requirements. In other embodiments, the surface of non-pressurized housing 240 that the protrusions are coupled to (such as removable plate 240*b*) is configured to bend or flex such that the protrusions are able to conform to a shape of the seabed for more effective seabed coupling. Protrusions may be located on both an upper and lower surface of the non-pressurized housing to provide similar seabed coupling for both sides of the node. By being substantially located on a plurality of the corners of one face of the non-pressurized node (such as 3 or 4 corners), the spaced apart protrusions are more likely to provide an effective seabed coupling over a variety of seabed surfaces (such as a harder/firmer seabed and non-flat seabed). In other words, the greater the distance between the protrusions, the greater likelihood for a successful seabed coupling. This increased distance between the protrusions is enabled partly by the square shape of the node, which provides maximum dimensions in a diagonal width of the node. In still other embodiments, the protrusions may be conductive so as to supply power to the node when coupled to one or more rails during storage or servicing.

The disclosed square or rectangular shaped node offers many advantages as opposed to a cylindrical, disc, or spherical shaped node and other prior art nodes. First, an outer (rectangular) shaped node helps to control node orientation during translation and rotation on deck. For example, the orientation and positioning of the node is important to ensure reliable connection to the deployment cable as well as providing precision positioning for connector attachment and wireless optical communications. In other words, for a highly automated node deployment, retrieval, and handling system (such as conveyors, stackers, node detectors, turn-tables, etc.), it is critical to know the exact positions of the node's edges, which is facilitated and/or made possible by a square or rectangle shaped node. Second, a square or rectangular node provides an efficient way to store large numbers of nodes in confined spaces (such as shipping containers), as well as increased mating and interlocking with other nodes. Third, the corner portions of the node (and particularly the node's non-pressurized housing) offer additional compartments to store various components and sensors without increasing the effective node size (e.g., a circular shaped node and a square shaped node may have the same effective node size for storage). Fourth, the square configuration of the node provides added strength at corners of the node for improved shock resistance, and in some embodiments, provides additional protection for the hydrophone. For example, protruding components such as hydrophones may be protected by the non-pressurized housing without increasing the effective node size. Fifth, additional areas are provided to attach housings, fenders/bumpers, node locks, and handling mechanisms to the node as compared to conventional nodes. Sixth, a square shaped node provides additional room and different configurations for internal components of the nodes, such as sensors and batteries, and allows for an overall minimized area of the node. This arrangement of internal components that are mostly rectangular (cuboid) in shape fits more evenly and compactly in a square shaped node and provides a more efficient use of space and minimization of the node housing for a given volume of a node. In one embodiment, the node provides a high-density footprint on the seabed based upon a relatively high water weight and a small contact surface area. Localized contact points (e.g., protrusions) in the corners or the periphery of the non-pressurizing housing also increase the contact pressure due to the small contact area. For the reasons described above and herein, the shape of the node and attachment to the cable provides for improved stability and more effective coupling of the node to the seabed than that found in prior art.

Node Locks

In one embodiment, seismic node 110 comprises one or more direct attachment mechanisms and/or node locks 220 that may be configured to directly attach seismic node 110 to deployment line 108, as described in more detail in U.S. patent application Ser. No. 14/736,926, filed on Jun. 11, 2015, incorporated herein by reference. This may be referred to as direct or in-line node coupling. In one embodiment, attachment mechanism 220 comprises a locking mechanism to help secure or retain deployment line 108 to seismic node 110. A plurality of direct attachment mechanisms may be located on any surfaces of node 110 or node housing 240. In one embodiment, a plurality of node locks 220 is positioned substantially in the center and/or middle of a surface of a node or node housing. The node locks may attach directly to the pressure housing and extend through the non-pressurized node housing 240. In this embodiment, a deployment line, when coupled to the plurality of node locks, is substantially coupled to the seismic node on its center axis. In some embodiments, the node locks may be offset or partially offset from the center axis of the node, which may aid the self-righting, balance, and/or handling of the node during deployment and retrieval. Node locks 220 are configured to attach, couple, and/or engage a portion of the deployment line to the node. Thus, a plurality of node locks 220 operates to couple a plurality of portions of the deployment line to the node. The node locks are configured to keep the deployment line fastened to the node during a seismic survey, such as during deployment from a vessel until the node reaches the seabed, during recording of seismic data while on the seabed, and during retrieval of the node from the seabed to a recovery vessel. Attachment mechanism 220 may be moved from an open and/or unlocked position to a closed and/or locked position via autonomous, semi-autonomous, or manual methods. In one embodiment, the components of node lock 220 are made of titanium, stainless steel, aluminum, marine bronze, and/or other substantially inert and non-corrosive materials, including polymer parts.

As shown in FIG. 2B, two node locks 220 are positioned substantially in the middle top face of the node. The node locks may be asymmetrical and oriented in opposing and/or offset orientations for better stability when deploying and retrieving the node from the seabed and for manufacturing/assembly purposes. Node locks may be configured in a positively open and/or a positively closed position, depending on the type of coupling/decoupling machines used. In some embodiments, a spring mechanism is used to bias the node lock in a closed and/or open position, and in other embodiments other biasing members may be used, such as a flexible plate, a torsion spring, or other bendable/twistable biasing members, as well as offset travel paths for the deployment wire causing it to act as a spring due to its in-line stiffness. A ferrule or other stopping mechanism 209 may be located on either side of the node on the deployment line, which helps prevent movement of the node on the deployment line, facilitates attaching/detaching of the node from the line, and facilitates seismic acoustic decoupling between the deployment line and the node. In other embodiments, ferrules and other stoppers can be used as a single stop between adjacent nodes (e.g., only one ferrule between each node), a plurality of redundant stoppers can be used between each node, or a double stopper and swivel type arrangement can be used between each node. A ferrule or stopper may limit the movement of the node by many configurations, such as by a sliding attachment point where the node slides between the stoppers, or the stopper may slide inside a cavity of the node and act as a sliding cavity stopper. The position of the stopper(s) on the deployment line and the coupling of the node to the deployment line is configured for acoustic decoupling between the node and the deployment line. In one embodiment, the distance between adjacent ferrules is greater than the width of the node, which facilitates the node to be seismically de-coupled from the wire/rope of the deployment line. In some embodiments, each node lock acts as a swivel to allow rotation of the node around the deployment line. In still other embodiments, the node locks also act as safety devices (e.g., each node lock may have one or more replaceable weak links) to avoid personnel injury and damage to the node or deployment line.

Node Housings

Figure 3:
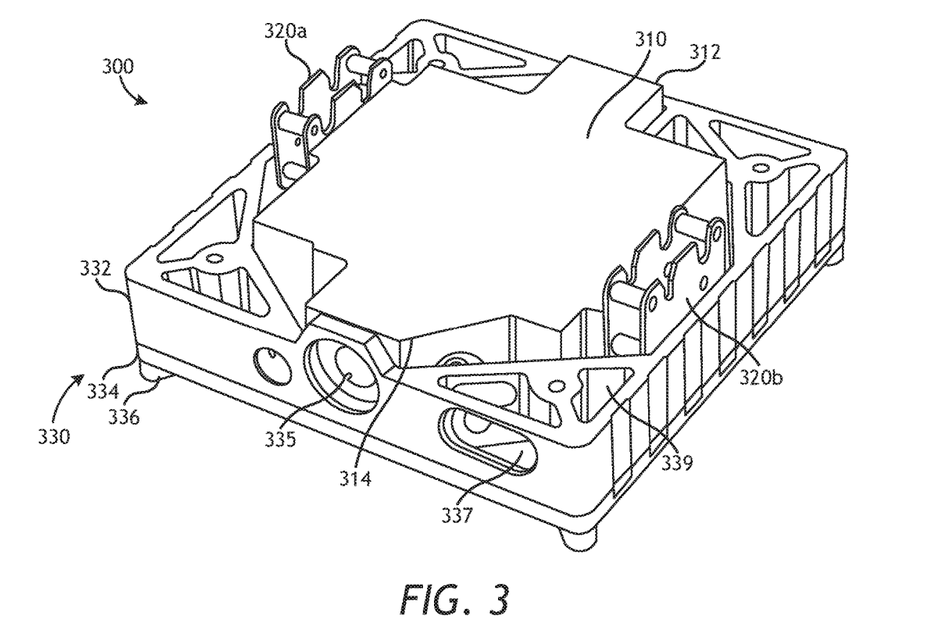
FIG. 3 is a perspective view diagram illustrating one embodiment of a square shaped autonomous seismic node.

FIG. 3 is a perspective view diagram illustrating one embodiment of a square shaped autonomous seismic node 300. Seismic node 300 may comprise a pressurized housing 310, a non-pressurized housing 330, and a plurality of node locks 320a, 320b. Pressurized housing 310 may be a complex shape with one or more irregularly shaped sides. For example, a first side of the pressurized housing has housing protrusion 314 that extends out at approximately 45 degrees and makes a first side of the pressurized housing substantially non-linear and/or multi-faceted. Likewise, housing protrusion 312 makes a second side of the pressurized housing substantially complex as well. Because of the irregularity in shape and sides, pressurized housing 310 is asymmetrical, which provides a non-circular and non-uniform cross section to the pressurized housing. This complex shape provides many benefits and advantages, but requires significant hurdles and disadvantages to address from an overall node design, manufacturing, and handling. For example, because pressurized node housing 310 is asymmetrical and has a plurality of multi-faceted sides, it has an increased surface area for cooling, which is particularly important for during on deck high powered charging of a power supply located within the pressurizing housing.

In one embodiment, pressurized node housing 310 is made from a single piece of material such that there is no separate connection or mating (or separate fasteners) between the bottom and the sides of the node. This unitary and/or monolithic construction provides many benefits, such as reduced exposure to the environment (such as pressure and temperature), reduced components for failure, and decreased labor and expense for node assembly or machining (if cast). In one embodiment, the node may include one or more openings or lids on one or more faces of pressurized node housing 310. In one embodiment, the monolithic construction is coupled to a lid that may be screwed, attached, set within, and/or coupled to pressurized node housing 310. In one embodiment, pressurized node housing 310 may be constructed from machining a bolt of 350 mm in diameter and made of titanium or aluminum material. In other embodiments, the housing may be cut from 100 mm plate of similar material and then machined to the appropriate size. In one embodiment, each of the internal compartments of pressurized node housing 310 is machined to size by removal of material from the single piece of stock material.

In conventional autonomous seismic nodes, the design and configuration has not allowed for cost effective mass production, such as thousands of nodes using expensive metals such as titanium. Traditionally, nodes are machined from large bolts of material into multiple components (such as a circumferential housing and multiple connecting plates) to form a symmetrical and/or cylindrical housing that are structurally joined or coupled together with O-rings and bolts as part of the node's assembly and interconnected by non-reliable cabling. Such a jointed pressurized housing may cause many detrimental issues, such as increased pressure failure potential, increased assembly time and error, and the creation of a large amount of waste and wasted material, all of which increases the costs of production. Further, while the pressurized node housing and related components is intended to be as non-corrosive as practically possible, anodized aluminum is the traditional material of choice for a pressurized node housing, primarily because it is easily machined and readily available. Because aluminum metal is corrosive, conventional aluminum nodes are machined and then anodized to help prevent corrosion. Other aluminum housing processes may use different finishes such as ceramic-based bonded coatings or surface painting. However, over time deep scratches to the aluminum node may damage the protective coating, causing the aluminum node to corrode. Titanium provides superior strength and non-corrosive benefits that have traditionally not been feasible for the design and manufacture of a system of autonomous seismic nodes. While titanium would be a preferred metal for the pressurized housing, its cost and difficulty to design makes conventional designs by machined techniques not feasible to be made of titanium.

In one embodiment, the pressurized housing is cast from titanium. In contrast to other materials (such as aluminum), cast titanium maintains its strength and material properties substantially equivalent to an article made from a machined bolt material. Other materials that can be cast are either too dense for a given strength, or their yield strength properties may significantly deteriorate, or the material becomes brittle and/or porous such that they cannot be used in the same way as a machined article from raw bolt material. Cast titanium also removes the need to use sacrificial anodes and/or expensive surface treatment to make it survive in water, in contrast to other materials like aluminum.

A pressurized housing that is formed from a cast offers numerous advantages. Because it is cast, it may be designed to minimize the weight of metal for a particular configuration of internal electronic components that reside in the body of the pressurized node housing. Further, casted titanium can use scrap material processes rather than higher quality stock material, which provides significant cost savings. Still further, rather than being limited to spherical, circular, and other symmetric designs that are more easily machined but are limited in orientation, casting offers additional variables for node configurations, such as complex/irregular shapes with little to no machining. This is important as the size, weight, and dimensions of the node (as well as the related cost) provides significant constraints for the mass production of node housings.

Because a non-uniform pressure housing may be more susceptible to damage with increased pressures (particularly those at the bottom of the seabed), non-uniform pressuring housing 310 is configured for increased stress resistance by the use of high strength titanium, which also has a reasonable density to limit the "in air" mass of the node. The strength of the cast housing may be improved by other design variables, such as variable outer wall thicknesses (particularly in potentially weak areas such as corners) and stress reduction by tuning corning radii, as well as design/testing procedures such as material integrity control and design simulation tools used for finite element simulation of stress and strain. In one embodiment, the monolithic pressuring housing can comprise a plurality of cast storage compartments (such as for placement of sensors 206 and batteries 204) that provides increased support to the node structure by providing load sharing between compartment walls/structural dividers and the outer wall. Because pressurized node housing 310 is asymmetrical, the placement of sensors and storage compartments may be configured in a way to provide a balanced weight and to provide mechanical integrity in potentially weak areas (such as the non-round corners).

As shown in FIG. 3, node 300 comprises non-pressurized housing 330 that substantially surrounds pressurized housing 310. In one embodiment non-pressurized housing may surround all sides of the pressurized housing, and in other embodiments it may only surround the vertical sides and one of the upper or lower horizontal surfaces of pressurized housing 310. In one embodiment, the non-pressurized housing has a cross section that is substantially in the shape of a square (with four similarly length sides). Thus, even if the pressurized housing is a complex and non-uniform shape, the non-pressurized housing provides an exterior form and/or shape to the node to make the ultimate node housing and/or dimensions substantially uniform (such as a box or cuboid). A substantially square shape to non-pressurized housing 330 provides many benefits. As one example, because the non-pressurized housing can be designed to cooperate and integrate with the intended node deployment, storage, and handling system, a wide variety of node sizes and configurations can be inserted into non-pressurized housing 330 for use with the same node deployment, storage, and handling system. For example, the pressurized node housing may be any shape, whether square, disc, spherical, or cylindrical shaped, but may be substantially enclosed or encapsulated by a square or rectangular non-pressurized housing or case. Thus, in one embodiment, non-pressurized node housing 330 makes the node deployment, storage, and handling system uniform and feasible for a wide variety of node designs with little to no change in the design of the node (as long as it fits within the non-pressurized housing) or non-pressurized housing.

In one embodiment, non-pressurized housing 330 comprises a body 332, one or more removable seabed coupling plates 334, and a plurality of protrusions 336. While not shown in FIG. 3, non-pressurized housing 330 may comprise a second plate that may be attached to an upper face or portion of pressurized node housing 310 and be coupled to the plurality of node locks 320a, 320b. Removable coupling plates 334 may have different patterns, suction holes, chamfered holes for soil compaction and fluid transportation, and/or protrusions for seabed coupling for a variety of seabed shapes and compositions. In some embodiments, removable coupling plates are used to balance the overall weight of the node to compensate for the asymmetric pressurized housing. In still other embodiments, removable coupling plates 334 can be used to change the mass balance for different deployment situations, such as high-water currents or steep slopes, and/or node penetration depth for softer seabeds, all of which may affect the node's effective height of the center of gravity. Non-pressurized housing 330 can be configured to mate with a plurality of different sizes and configurations of removable plates for a variety of purposes. Thus, in one embodiment, non-pressurized housing 330 may be a modular housing, in that it is composed of standardized units or sections for easy construction, flexible arrangement, and removability, whether for repair/damage or for different functionality for an intended seabed application.

In one embodiment, non-pressurized housing 330 is capable of compensation for weight, buoyancy, and mass distribution for balancing objectives. For example, if pressurized node housing 310 is too heavy or too light, non-pressurized housing 330 can be designed (or weights added in one or more storage compartments) to be heavy or light as appropriate. In one embodiment, node 300 has a center of gravity substantially in the center of the node from both a vertical and horizontal direction. This is beneficial as symmetric mass balancing (such as center of gravity and center of balance close to center) gives a same sensor response to a seismic signal mostly independent of azimuth of the incoming seismic wave front. In some embodiments, non-pressurized node housing 330 is used to re-center the center of gravity and/or center of mass of the node if pressurized node housing 310 is not centered.

A plurality of channels, holes, openings, conduits, and/or storage compartments can be formed in non-pressurized housing 330 as well as in the volume of space(s) formed between the exterior dimensions of pressurized housing 310 and the interior dimensions of non-pressurized housing 330. Storage compartments 337, 339 can be exposed to water or be substantially watertight, and may provide protection to the included components from damage and stress during handling, storage, deployment, and retrieval of the node. For example, storage compartment 337 is exposed to water and allows seawater coupling to one or more pressure responsive devices, such as hydrophones, that may be coupled to the pressurized housing (e.g., placed on the outside surface of the pressurized housing). On the other hand, compartment 339 is not exposed to water and may be suitable for storing a power supply or other devices. Acoustic devices, such as transponders or acoustic pingers, may also be placed within non-pressurized housing 330 and protected from damage. The storage compartments may be located near the corners of non-pressurized housing 330 to take advantage of the non-uniform shape of pressurized housing 310. Various portions of non-pressurized housing 330 may be open and expose the pressurized node housing 310 as needed, such as for a hydrophone, node locks, and data/power transfer connection. For example, opening 335 in the non-pressurized housing exposes data/power transfer connection for use during on-deck data and power transfers (including wireless data transfer) without taking the non-pressurized housing off.

Figure 4A:
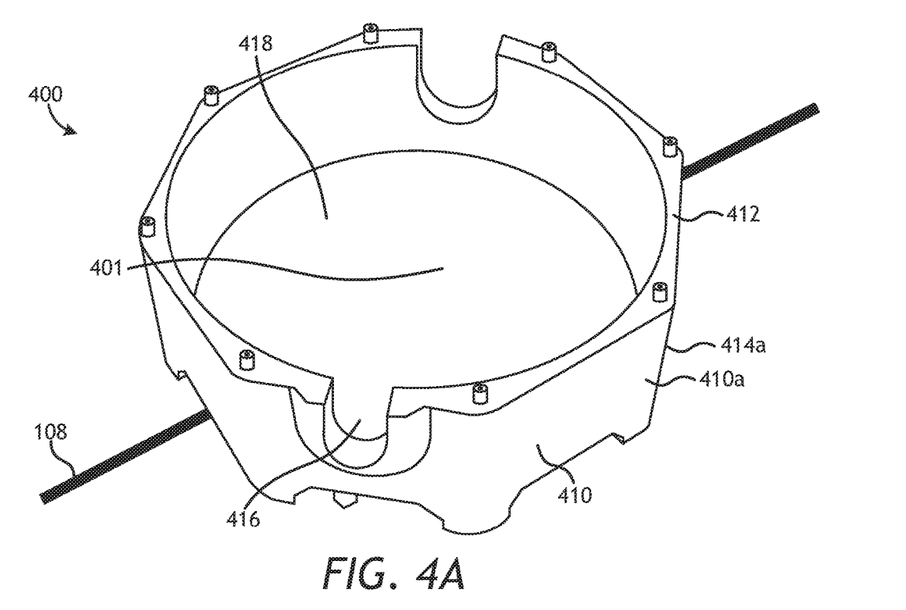
FIGS. 4A and 4B are perspective view diagrams illustrating one embodiment of a non-pressurized housing that is not square shaped.
Figure 4B:
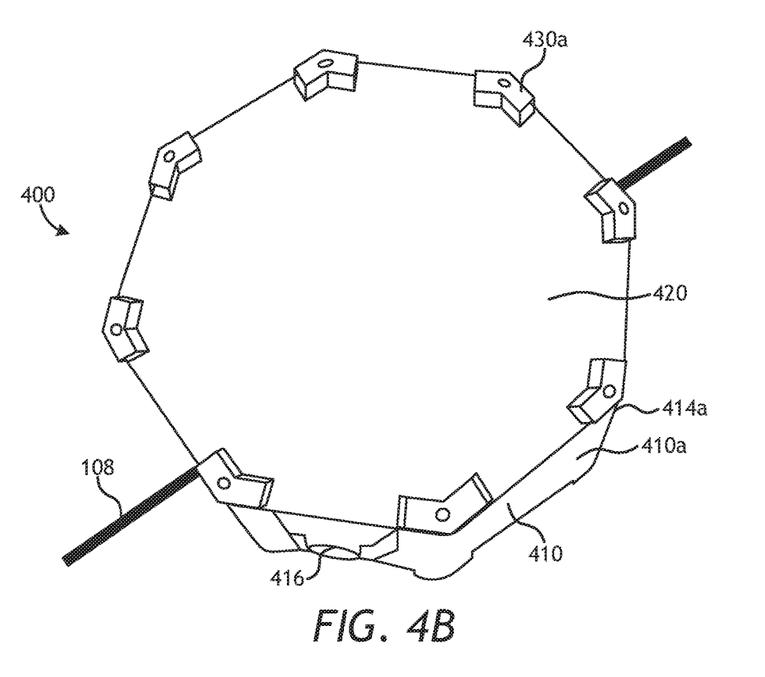

FIGS. 4A and 4B are perspective view diagrams illustrating one embodiment of a non-pressurized housing that is not square shaped. Non-pressurized housing 400 may be directly or indirectly coupled to deployment line 108. Non-pressurized housing 400 comprises a plurality of sides 410a (such as 8) forming a plurality of corners 414a around a circumference of housing 400. Body 410 comprises a lower face 418 that is coupled to plurality of sides 410a, thereby forming cavity 401. One or more of the lower and/or upper faces and/or plates may be removable. For example, as shown in FIG. 4B, upper plate 420 is coupled to body 410 along a periphery edge 412 of body 410. A plurality of removable protrusions 430a may be coupled to upper housing plate 420. One or more sides 410a may comprise one or more openings 416 that is configured to couple one or more components located within the non-pressurized housing (such as a transponder) to the water.

While the disclosed embodiments are generally directed to a non-pressurized housing that encloses a pressurized node, the disclosed housing is configured to hold a plurality of other seismic and non-seismic devices and payloads, such as transponders, weights, and pop-up buoys, within cavity 401. Further, to the extent that non-pressurized housing 400 is attached to and/or coupled with one or more direct attachment mechanisms 220, the non-pressurized housing provides the capability to deploy and retrieve a wide variety of payloads in a safe and highly automated fashion to the seabed using a cable or other method (such as an ROV), similar to that for the illustrated node in FIG. 2B. The advantage of using a common form factor for a variety of devices is that such devices can (enclosed by non-pressurized housing 400) can easily share the same deployment line and automated handling and storage system with little to no variation in the actual deployment/retrieval techniques and equipment.

In one embodiment, non-pressurized housing or case 400 comprises a bolted shell, made from two molded plastic parts, and in one embodiment is in the form of a clamshell. In one embodiment, a node lock assembly and/or fastening bolts may be used to secure the two parts of the housing together. In one embodiment, non-pressurized housing or case 400 comprises a first part and a second part, where each part consists of at a least portion of a bottom, top, and side face. In other embodiments, a first part includes substantially all of the side faces and either the top or bottom face, and a second part includes the bottom or top face, such that the two parts can be coupled where the second part acts as a lid to the non-pressurized housing.

FIG. 5 is a perspective view diagram illustrating one embodiment of a square shaped autonomous seismic node 500. Seismic node 500 may comprise a pressurized housing (not shown) surrounded by non-pressurized housing 510 coupled to a plurality of node locks 520. Node locks 520a, 520b may be coupled to both the pressurized housing and non-pressurized housing 510. In one embodiment, node locks 520a, 520b extend through one or more openings of non-pressurized housing 510, such as on one substantially flat surface of the housing. Node locks may be directly attached to the pressurized node housing and/or non-pressurized housing, and in one embodiment are offset from each other for balancing of the node. In one embodiment, the node locks 520 are located substantially on opposite ends of a face of the node, such as diagonal corners 511a, 511b of the node. This configuration provides a diagonal coupling of the deployment line to the node. Such a diagonal coupling of the node locks provides many benefits, such as reduced drag during deployment and retrieval operations through the water, as well as dragging along the seabed. In other embodiments, the node locks can be coupled so as to provide a straight cable orientation, similar to the node lock configuration disclosed in FIG. 2B. In other embodiments, non-pressurized housing 510 is configured to provide a non-rigid coupling between one or more node locks and one or more seismic sensors contained within a pressurized housing enclosed by the non-pressurized housing 510.

Referring still to FIG. 5, in one embodiment the pressurized node housing may be covered by non-pressurized housing 510 with a cross section that is substantially square or rectangular. Non-pressurized housing 510 has a first plurality of substantially perpendicular sides 514a, 514b that are parallel to a second plurality of opposite sides. The corners and edges of the node between sides 514 may or may not be rounded, beveled, angled, or otherwise softened. One or more openings 516 in non-pressurized housing 510 may couple and/or expose inner portions of the non-pressurized housing (such as one or more sensors) to water. Non-pressurized housing 510 can be formed from two halves of substantially equal sections, and in other embodiments may be in the shape of an open box with one or more removable plates.

Figure 6A:
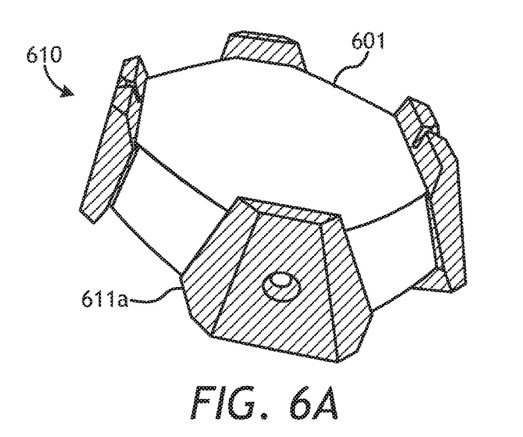
FIG. 6A is a perspective view diagram illustrating one embodiment of an autonomous seismic node coupled to a bumper.
Figure 6B:
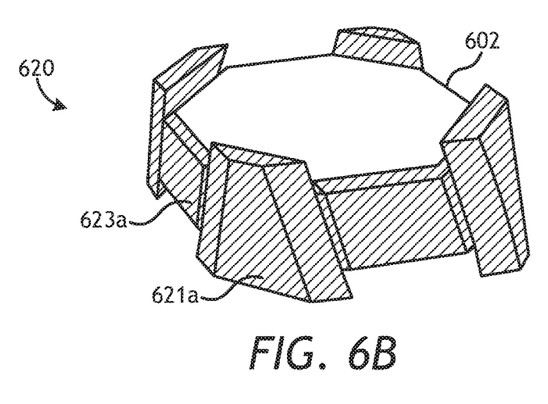
FIG. 6B is a perspective view diagram illustrating one embodiment of an autonomous seismic node coupled to a bumper.
Figure 6C:
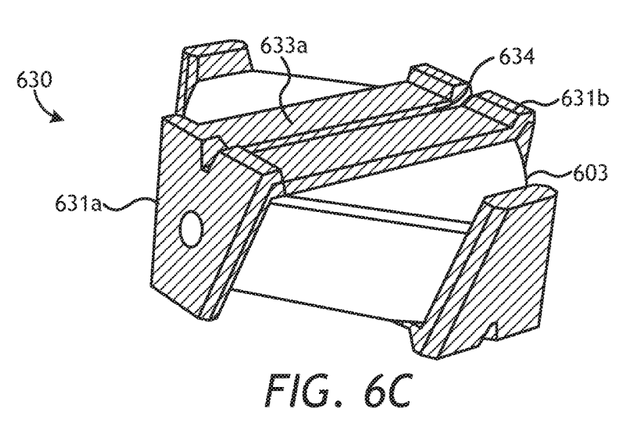
FIG. 6C is a perspective view diagram illustrating one embodiment of an autonomous seismic node coupled to a bumper.

FIGS. 6A-6C illustrate various embodiments of an autonomous seismic node coupled to various embodiments of a bumper (or fender). The bumper provides many functions, such as protecting the node from shocks and rough treatment, coupling the node to the seabed for better readings and stability, and assisting in the stackability, storing, alignment, and handling of the nodes. Each bumper may be made of a durable material such as rubber, plastic, carbon fiber, or metal. In one embodiment, each bumper system may be configured to allow the node to be easily stackable or storable with other seismic nodes. Each bumper may comprise an upper portion and a lower portion that extend beyond a top and bottom face, respectively, of a node. Thus, in one embodiment, bumpers may be configured to act as teeth and/or protrusions for the node, along with all of the benefits and configurations described herein. In a variety of configurations, the node bumpers can be placed on the top and bottom portions of the node, the corners of the node, and/or the sides of node. In one embodiment, the use of one or more bumpers provides an overall substantially square or rectangular shape to the node. Such a configuration may include square shaped bumpers surrounding a cylindrical pressure housing or other non-square shaped node housing to make the overall node profile square or rectangular shaped. In other embodiments, one or more node locks may be integrated with and/or attached or coupled to the node locks, and in other embodiments the bumpers are designed to minimize interference with the node locks.

In FIG. 6A, seismic node 601 may be substantially square shaped with corner bumper 611 coupled to each of its four corners via one or more bolts or pins. In another embodiment, portions of the node, such as the corners, include grooved pockets or recesses or receptacles that engage a corresponding mating unit on a bumper. In FIG. 6B, seismic node 602 may be coupled to a bumper frame 620 comprising a first plurality of bumpers 621 on each of its corners and a second plurality of bumpers 623 on each of its side faces, thereby forming bumper frame 620 substantially surrounding a plurality of sides of the node. Bumpers 621 and bumpers 623 may be coupled to each other for increased strength. In FIG. 6C, seismic node 603 may be coupled to a plurality of bumpers 630. Bumper 630 may include a first portion 633 that is coupled to a top face of the node and a plurality of second portions 631a, 631b that are coupled to one or more side faces of the node. Bumper 630 may include groove 634 in upper portion 633 to receive the deployment line for increased retention and attachment of the deployment line. Top surface bumper 633 and side surface bumpers 631a, 631b may be individual pieces attached separately to the node. In other embodiments they may be integrated such as to form a U-shaped bumper such that two separate U-shaped bumpers are placed on opposite ends of the seismic node to form a bumper system 630 partially or substantially surrounding the node. In one embodiment, the bumper is made of a separate material from the pressurized node housing, such as a molded plastic such as polyethylene, which provides good shock resistance and can be built up by a plurality of plastic shells and ribs for increased thickness and other properties.

Many other variations in the overall configuration of a node, pressurizing node housing, non-pressurized node housing, and the number and arrangement of node locks are possible within the scope of the invention. For example, while many of the disclosed embodiments discuss a non-pressurized housing that substantially surrounds a node, the non-pressurized housing may also surround and/or enclose other payload devices, such as weights and transponders, thereby allowing a wide variety of seismic devices to be directly coupled to the deployment cable in a highly automated fashion. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An apparatus for deploying a seismic device to the seabed, comprising:
    a non-pressure housing that surrounds an autonomous seismic node for recording seismic signals on the seabed, wherein the non-pressure housing comprises a shape approximately in the form of a rectangular box when assembled around the autonomous seismic node.

2. The apparatus of claim 1, wherein a cross-sectional area of the non-pressure housing is approximately a rectangle.

3. The apparatus of claim 1, wherein the non-pressure housing substantially encloses the autonomous seismic node.

4. The apparatus of claim 1, wherein the autonomous seismic node comprises a plurality of internal components that are each approximately cuboid in shape.

5. The apparatus of claim 4, wherein the non-pressure housing substantially encloses the plurality of internal components.

6. The apparatus of claim 1, wherein the non-pressure housing comprises a plurality of modular components that are removably attached.

7. The apparatus of claim 1, wherein the non-pressure housing comprises a plurality of removable faces.

8. The apparatus of claim 1, wherein the non-pressure housing comprises a first part and a second part, wherein the first part comprises one or more sides of the non-pressure housing and the second part comprises one or more upper or lower faces of the non-pressure housing.

9. The apparatus of claim 1, wherein the non-pressure housing is coupled to one or more direct attachment mechanisms configured for direct attachment to a deployment line.

10. The apparatus of claim 1, wherein the non-pressure housing is configured to couple with a deployment line.

11. The apparatus of claim 1, wherein the non-pressure housing is configured to couple with the seabed.

12. The apparatus of claim 1, wherein the non-pressure housing comprises a body that has acoustic transparency.

13. The apparatus of claim 1, further comprising an acoustic transponder coupled to the autonomous seismic node, wherein the non-pressure housing is configured to couple the acoustic transponder to water.

14. The apparatus of claim 1, wherein the non-pressure housing comprises an opening configured for protrusion of a hydrophone from the non-pressure housing.

15. An autonomous seismic node for deployment to the seabed, comprising:
    a plurality of electronic components comprising at least one seismic sensor, at least one data recording unit, and at least one clock;
    one or more pressure housings comprising at least one of the plurality of electronic components; and
    a modular non-pressure housing surrounding the one or more pressure housings,
    wherein the non-pressure housing comprises a shape approximately in the form of a rectangular box when assembled around the one or more pressure housings,
    wherein the autonomous seismic node is configured to record seismic signals on the seabed.

16. The autonomous seismic node of claim 15, wherein a cross-sectional area of the modular non-pressure housing is approximately a rectangle.

17. The autonomous seismic node of claim 15, wherein the one or more pressure housings are each approximately cuboid in shape.

18. The autonomous seismic node of claim 15, wherein an exterior shape of the modular non-pressure housing provides the exterior shape of the autonomous seismic node.

19. The autonomous seismic node of claim 15, wherein the non-pressure housing comprises a plurality of removable sections.

20. The autonomous seismic node of claim 15, wherein the non-pressure housing substantially surrounds the one or more pressure housings.

21. An autonomous seismic node for deployment to the seabed, comprising:
    one or more pressure housings comprising at least one seismic sensor, at least one data recording unit, and at least one clock; and
    a modular housing coupled to the one or more pressure housings,
    wherein the modular housing comprises a plurality of removable sections that approximately form a shape of a rectangular box when assembled around the one or more pressure housings,
    wherein the autonomous seismic node is configured to record seismic signals on the seabed.

22. The autonomous seismic node of claim 21, wherein at least some of the plurality of removable sections are fastened together when assembled around the one or more pressure housings.

23. The autonomous seismic node of claim 21, wherein the one or more pressure housings are each approximately cuboid in shape.

24. The autonomous seismic node of claim 21, wherein the modular housing is coupled to one or more direct attachment mechanisms configured for direct attachment to a deployment line.

* * * * *